(12) United States Patent
Elkovitch

(10) Patent No.: US 6,399,737 B1
(45) Date of Patent: Jun. 4, 2002

(54) EMI-SHIELDING THERMOPLASTIC COMPOSITION, METHOD FOR THE PREPARATION THEREOF, AND PELLETS AND ARTICLES DERIVED THEREFROM

(75) Inventor: Mark D. Elkovitch, Clifton Park, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,573

(22) Filed: Sep. 21, 2001

(51) Int. Cl.$^7$ .............................................. C08G 64/00
(52) U.S. Cl. ..................... 528/196; 528/176; 528/198; 528/271; 528/272; 528/322; 528/332; 428/411.1
(58) Field of Search ................................ 528/176, 196, 528/198, 271, 322, 332; 428/411.1

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield et al. |
| 2,512,606 A | 6/1950 | Bolton et al. |
| 3,023,192 A | 2/1962 | Shivers |
| 3,047,539 A | 7/1962 | Pengilly |
| 3,169,121 A | 2/1965 | Goldberg |
| 3,635,895 A | 1/1972 | Kramer |
| 3,651,014 A | 3/1972 | Witsiepe |
| 3,763,109 A | 10/1973 | Witsiepe |
| 3,766,146 A | 10/1973 | Witsiepe |
| 3,784,520 A | 1/1974 | Hoeschele |
| 3,801,547 A | 4/1974 | Hoeschele |
| 3,803,085 A | 4/1974 | Takehoshi et al. |
| 3,905,942 A | 9/1975 | Takekoshi et al. |
| 4,001,184 A | 1/1977 | Scott |
| 4,156,774 A | 5/1979 | Buxbaum et al. |
| 4,217,438 A | 8/1980 | Brunelle et al. |
| 4,264,761 A | 4/1981 | McGirk |
| 4,355,155 A | 10/1982 | Nelsen |
| 4,388,422 A | 6/1983 | Gerteisen et al. |
| 4,404,125 A | 9/1983 | Abolins et al. |
| 4,487,896 A | 12/1984 | Mark et al. |
| 4,566,990 A | 1/1986 | Liu et al. |
| 4,596,670 A | 6/1986 | Liu |
| 5,366,664 A | 11/1994 | Varadan et al. |
| 5,399,295 A | 3/1995 | Gamble et al. |
| 5,736,603 A | 4/1998 | Pfeiffer et al. |
| 6,153,683 A | 11/2000 | Enomoto |
| 6,162,536 A | 12/2000 | Montsinger |

FOREIGN PATENT DOCUMENTS

| | | |
|---|---|---|
| WO | WO 00/42097 | 7/2000 |
| WO | WO 00/52710 | 9/2000 |

OTHER PUBLICATIONS

J. Amarasekera, A. Burnell, C. Lietzau, and K. Balfour, Polymer Preprints 2001, 42(2), 36–37; "Conductive Fillers for Thermoplastics Applications".

Supplement Volume, Kirk–Othmer Encyclopedia of Chemical Technology, pp. 746–773 (1971). John Wiley & Sons, Inc.

*Primary Examiner*—Terressa M. Boykin

(57) ABSTRACT

A composition comprises a thermoplastic resin and an electromagnetic shielding agent that contains a synergistic combination of metal-coated fibers and metal fibers. The composition provides effective EMI-shielding at low levels of the electromagnetic shielding agent. Also described are methods of preparing the composition, as well as pellets and articles comprising the composition and its reaction products.

34 Claims, No Drawings

EMI-SHIELDING THERMOPLASTIC COMPOSITION, METHOD FOR THE PREPARATION THEREOF, AND PELLETS AND ARTICLES DERIVED THEREFROM

BACKGROUND OF INVENTION

Electronic devices require protection from electromagnetic interferences in order to function properly. As a result, these devices are often made of materials exhibiting a high electromagnetic/radio frequency interference (EMI/RFI) shielding effectiveness (SE). Introduction of conductive material to thermoplastic resins increases the electromagnetic shielding effectiveness of the resulting thermoplastic compositions. Unfortunately, obtaining a high level of shielding effectiveness is limited by the amount of conductive filler that can be added to the composition. Often, low loading of conductive fillers does not provide adequate shielding. Consequently, there is a need for thermoplastic compositions with low loadings of conductive fillers while at the same time providing good electromagnetic shielding properties.

SUMMARY OF INVENTION

The above-described and other drawbacks and disadvantages of the prior art are alleviated by a composition comprising a thermoplastic resin and about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

Other embodiments, including a method of preparing the compositions and articles comprising the compositions, are described below.

DETAILED DESCRIPTION

One embodiment is a composition comprising a thermoplastic resin and about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

Suitable thermoplastic resins include polycarbonates, polyesters, polyamides, polyetheresters, polyestercarbonates, poly(arylene ether)s, polyamideimides, polyetherimides, polystyrenes, acrylonitrile-butadiene-styrene copolymers, blends comprising at least one of the foregoing resins, and the like.

Suitable polycarbonates include compositions having structural units of the formula (I):

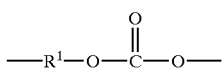

wherein $R^1$ is selected from the group consisting of $C_1$–$C_{12}$ aliphatic radicals, $C_5$–$C_7$ alicyclic radicals, $C_6$–$C_{20}$ aromatic radicals, and $C_6$–$C_{20}$ aromatic organic radicals having the structural formula (II):

$$-A^1-Y^1-A^2- \qquad (II)$$

wherein $A^1$ and $A^2$ are each independently a monocyclic divalent $C_6$–$C_{20}$ aryl radical and $Y^1$ is a bridging radical having one or two atoms that separate $A^1$ from $A^2$. In a preferred embodiment, one atom separates $A^1$ from $A^2$. Illustrative non-limiting examples of $Y^1$ bridging radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene.

Polycarbonates may be produced by the interfacial reaction of dihydroxy compounds in which only one atom separates $A^1$ and $A^2$. As used herein, the term "dihydroxy compound" includes, for example, bisphenol compounds having the formula (III):

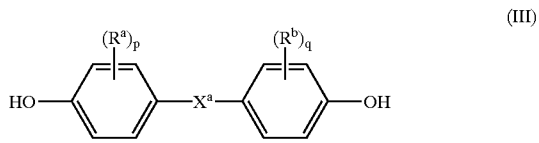

wherein $R^a$ and $R^b$ each independently represent a halogen atom or a $C_1$–$C_6$ monovalent hydrocarbon group; p and q are each independently integers from 0 to 4; and $X^a$ represents one of the groups of formula (IV):

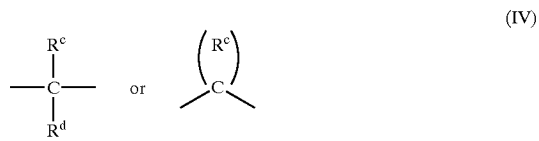

wherein $R^c$ and $R^d$ each independently represent a hydrogen atom or a C—C monovalent linear or cyclic hydrocarbon group, and $R^e$ is a C—C divalent hydrocarbon group.

Some illustrative, non-limiting examples of suitable dihydroxy compounds include the dihydroxy-substituted aromatic hydrocarbons disclosed by name or formula (generic or specific) in U.S. Pat. 4,217,438, which is incorporated herein by reference. Specific bisphenol compounds that may be represented by formula (III) include 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)-n-butane; bis(4-hydroxyphenyl)phenylmethane; 2,2-bis(4-hydroxy-1-methylphenyl)propane; 1,1-bis(4-hydroxy-t-butylphenyl) propane; 2,2-bis(4-hydroxy-3-bromophenyl)propane; 1,1-bis(4-hydroxyphenyl)cyclopentane; and 1,1-bis(4-hydroxyphenyl)cyclohexane; and the like.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyestercarbonate resins may also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups, which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatinbis-phenol, tris-phenol TC (1,3,5-tris((p-hydroxyphenyl) isopropyl)benzene), tris-phenol PA (4(4(1,1-bis(p-hydroxyphenyl)-ethyl) alpha,alpha-dimethyl benzyl) phenol), 4-chloroformyl phthalic anhydride, trimesic acid and benzophenone tetracarboxylic acid. The branching agents may be added at a level of about 0.05 to about 2 weight percent. Branching agents and procedures for making branched polycarbonates are described in U.S. Pat. Nos. 3,635,895 and 4,001,184, which are incorporated by reference. All types of polycarbonate end groups are contemplated as being within the scope of the polycarbonate compositions.

Preferred polycarbonates are based on bisphenol A, in which each of $A^1$ and $A^2$ is p-phenylene and $Y^1$ is isopropylidene. Preferably, the weight average molecular weight of the polycarbonate is about 5,000 to about 100,000 AMU. Within this range, the polycarbonate molecular weight is preferably at least about 10,000 AMU, more preferably at least about 35,000 AMU. Also within this range, the polycarbonate molecular weight is preferably up to about 65,000 AMU, more preferably up to about 35,000 AMU.

Suitable thermoplastic resins also include polyestercarbonates, which contain, in addition to recurring polycarbonate chain units of the formula (V):

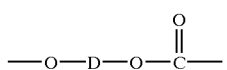

(V)

wherein D is a $C_6$–$C_{20}$ divalent aromatic radical of the dihydroxy compound employed in the polymerization reaction, recurring carboxylate units, for example of the formula (VI):

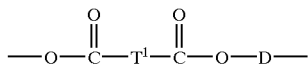

(VI)

wherein D is a defined above and T is a $C_6$–$C_{20}$ divalent aromatic radical such as phenylene, naphthylene, biphenylene, substituted phenylene and the like; a $C_6$–$C_{20}$ divalent aliphatic-aromatic hydrocarbon radical such as an alkaryl or alkaryl radical; or two or more aromatic groups connected through such aromatic linkages.

The polyestercarbonate resins may be prepared by interfacial polymerization techniques as described in, for example, U.S. Pat. Nos. 3,169,121 and 4,487,896.

In general, any dicarboxylic acid conventionally used in the preparation of linear polyesters may be utilized in the preparation of the polyestercarbonate resins described herein. Generally, suitable dicarboxylic acids include $C_2$–$C_{20}$ aliphatic dicarboxylic acids, $C_6$–$C_{20}$ aromatic dicarboxylic acids, and $C_6$–$C_{30}$ aliphaticaromatic dicarboxylic acids. These acids are well known and are disclosed, for example, in U.S. Pat. No. 3,169,121. Mixtures of dicarboxylic acids may be employed. Most preferred as aromatic dicarboxylic acids are isophthalic acid, terephthalic acid, and mixtures thereof.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

Suitable polyesters include those derived from an aliphatic, cycloaliphatic, or aromatic diol, or mixtures thereof, and at least one aromatic dicarboxylic acid. Preferred polyesters are derived from an aliphatic diol and an aromatic dicarboxylic acid having repeating units of the following formula (VII):

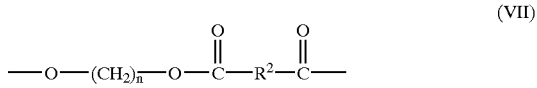

(VII)

wherein n is an integer of from 2 to 6, and $R^2$ is a $C_6$–$C_{20}$ divalent aryl radical comprising a decarboxylated residue derived from an aromatic dicarboxylic acid.

Examples of aromatic dicarboxylic acids represented by the decarboxylated residue $R^2$ are isophthalic or terephthalic acid, 1,2-di(p-carboxyphenyl)ethane, 4,4'-dicarboxydiphenyl ether, 4,4'-bisbenzoic acid, and the like, and mixtures comprising at least one of the foregoing aromatic dicarboxylic acids. All of these acids contain at least one aromatic nucleus. Acids containing fused rings can also be present, such as in 1,4- 1,5- or 2,6-naphthalene dicarboxylic acids. Preferred dicarboxylic acids include terephthalic acid, isophthalic acid, naphthalene dicarboxylic acid, mixtures comprising at least one of the foregoing dicarboxylic acids, and the like.

The diol may be a $C_2$–$C_{12}$ aliphatic diol, such as ethylene glycol, propylene glycol, trimethylene glycol, 2-methyl-1, 3-propane glycol, 1,4-butanediol, hexamethylene glycol, decamethylene glycol, cyclohexane dimethanol, neopentylene glycol, or the like; or a $C_6$–$C_{18}$ aromatic diol such as hydroquinone, resorcinol, or the like; or a combination comprising at least one of the foregoing diols.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

Useful polyesters include poly(ethylene terephthalate) (PET), poly(1,4-butylene terephthalate) (PBT), and poly (propylene terephthalate) (PPT). An exemplary PBT resin is obtained by copolymerizing a glycol component at least about 70 mole %, preferably at least about 80 mole %, of tetramethylene glycol, and an acid component comprising at least about 70 mole %, preferably at least about 80 mole %, of terephthalic acid, or polyester-forming derivatives thereof. The preferred glycol component may contain not more than about 30 mole %, preferably not more than about 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The preferred acid component may contain not more than about 30 mole %, preferably not more than about 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxyiic acid, 4,4'-diphenoxyethane dicarboxylic acid, p-hydroxy benzoic acid, sebacic acid, adipic acid, and polyester-forming derivatives thereof.

Suitable polyamide resins may be from the generic family of resins known as nylons, characterized by the presence of an amide group (—C(O)NH—). Nylon-6 and nylon-6,6 are the generally preferred polyamides and are available from a variety of commercial sources. Other polyamides include nylon-4,6, nylon-12, nylon-6,10, nylon 6,9, nylon 6/6T, and nylon 6,6/6T with triamine contents below about 0.5 weight percent, and the like. Mixtures of various polyamides, as well as various polyamide copolymers, are also useful.

The polyamides can be obtained by a number of processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon-4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane, 2,2-di-(4-aminophenyl)propane, 2,2-di-(4-aminocyclohexyl)propane, among others. Copolymers of caprolactam with diacids and diamines are also suitable.

Useful thermoplastic resins further include polyetheresters. Polyetheresters are known materials, and their preparation is described in, for example, U.S. Pat. Nos. 3,023,192; 3,651,014; 3,763,109; 3,766,146; 3,784,520; 3,801,547; 4,156,774; 4,264,761; and 4,355,155.

Suitable thermoplastic polyetheresters include both random and block copolymers. In general these are prepared by conventional esterification/polycondensation processes from (a) one or more diols, (b) one or more dicarboxylic acids, (c) one or more long chain ether glycols, and optionally, (d) one or more caprolactones or polycaprolactones.

Diols (a) used in the preparation of the copolyetheresters include both saturated and unsaturated aliphatic and cycloaliphatic dihydroxy compounds as well as aromatic dihydroxy compounds. These diols are preferably of a low molecular weight, i.e. having a molecular weight of about 300 grams/mole (g/mol) or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Examples of specific diols include, for example, ethylene glycol; propanediol; butanediol; pentanediol; 2-methylpropanediol; 2,2-dimethyl propanediol; hexanediol; decanediol; 2-octyl undecanediol; 1,2-, 1,3- and 1,4-dihydroxy cyclohexane; 1,2-, 1,3- and 1,4-cyclohexane dimethanol; butenediol; hexenediol, and the like. Especially preferred are 1,4-butanediol and mixtures thereof with hexanediol or butenediol. Aromatic diols suitable for use in the preparation of copolyetheresters are generally $C_6$–$C_{19}$ aromatic diols. Included among the aromatic diols are resorcinol; hydroquinone; 1,5-dihydroxy naphthalene; 4,4'-dihydroxydiphenyl; bis(p-hydroxyphenyl)methane; 2,2-bis (p-hydroxy phenyl)propane; and the like; and combinations comprising at least one of the foregoing aromatic diols. Especially preferred diols are the saturated aliphatic diols, mixtures thereof and mixtures of a saturated diol (s) with an unsaturated diol(s), wherein each diol contains from 2 to about 8 carbon atoms. Where more than one diol is employed, it is preferred that at least about 60 mole %, most preferably at least about 80 mole %, based on the total diol content, be the same diol. As mentioned above, the preferred thermoplastic elastomers are those in which 1,4-butanediol is present in a predominant amount.

Dicarboxylic acids (b) suitable for use in the preparation of the polyetheresters include aliphatic, cycloaliphatic, and/or aromatic dicarboxylic acids. These acids are preferably of a low molecular weight, i.e., having a molecular weight of less than about 350 g/mol; however, higher molecular weight dicarboxylic acids, especially dimer acids, may also be used. The term "dicarboxylic acids" as used herein, includes equivalents of dicarboxylic acids having two functional carboxyl groups that perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations that do not substantially interfere with the polymer formation and use of the polymer in the practice of this invention. Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic. Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Preferred polyetherester modifiers include those containing high molecular weight polycaprolactone or polytetrahydrofuran polymers, such as poly(butylene terephthalate)-poly (tetrahydrofuran) block copolymers commercially available from DuPont under the trademark HYTREL®, and poly(cyclohexamethylene) cyclohexylene dicarboxylate-polytetrahydrofuran block copolymers commercially available from Eastman under the trademark ECDEL®.

Useful thermoplastic resins further include poly(arylene ether) resins. The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Useful poly(arylene ether)s may comprise a plurality of structural units of the formula (VIII):

(VIII)

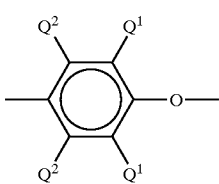

wherein for each structural unit, each $Q^1$ is independently halogen, $C_1$–$C_7$ primary or secondary lower alkyl, $C_6$–$C_{20}$ phenyl, $C_1$–$C_7$ haloalkyl, $C_1$–$C_7$ aminoalkyl, hydrocarbonoxy, halohydrocarbonoxy wherein at least two carbon atoms separate the halogen and oxygen atoms, or the like; and each $Q^2$ is independently hydrogen, halogen, $C_1$–$C_7$ primary or secondary lower alkyl, $C_6$–$C_{20}$ phenyl, $C_1$–$C_7$ haloalkyl, hydrocarbonoxy, halohydrocarbonoxy wherein at least two carbon atoms separate the halogen and oxygen atoms, or the like. Preferably, each $Q^1$ is $C_1$–$C_7$ alkyl or $C_6$–$C_{20}$ phenyl, especially $C_{1-4}$ alkyl, and each $Q^2$ is hydrogen or methyl.

Both homopolymer and copolymer poly(arylene ether) resins are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s used herein may further include combinations comprising at least one of the above.

Suitable polyamideimides may be prepared by the reaction of dianhydrides with diamines containing preformed amide groups resulting in an amideimide structure as, for example, structure (IX):

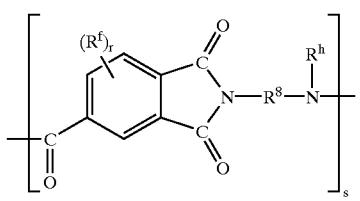

(IX)

wherein each $R^f$ is independently selected from $C_1$–$C_{12}$ alkyl radicals, halogen, substituted $C_1$–$C_{12}$ alkyl radicals containing substituent groups such as halogen or $C_1$–$C_{12}$ alkoxy, and the like; $R^h$ is selected from hydrogen, $C_1$–$C_{12}$ alkyl radicals, $C_6$–$C_{18}$ aryl radicals, $C_7$–$C_{18}$ aralkyl radicals, $C_7$–$C_{18}$ alkyaryl radicals, and the like; $R^g$ is selected from $C_6$–$C_{30}$ divalent aromatic organic radicals, $C_2$–$C_{20}$ alkylene radicals, $C_6$–$C_{30}$ alkylidene radicals, $C_3$–$C_8$ cycloalkylene radicals containing, and the like; r represents an integer having a value 0, 1, 2, or 3 corresponding to the number of replaceable hydrogen atoms present on the aromatic ring; and s is an integer of about 10 to about 500.

Polyamideimides may be prepared by the methods disclosed in, for example, Supplement Volume, Kirk-Othmer Encyclopedia of Chemical Technology, pages 746–773 (1971). Polyamideimides are also commercially available as, for example the reaction product of trimellitic anhydride and aromatic diamine available under the trademark TORLON® from BP Amoco Engineer Polymers.

Suitable polyetherimides include those of the formula (X):

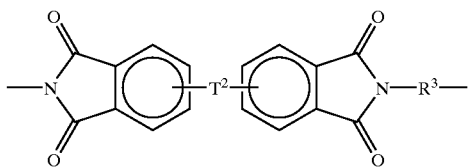

(X)

wherein $T^2$ is —O— or a group of the formula —O—Z—O— wherein the divalent bonds of the —O— or the —O—Z—O— group are in the 3,3', 3,4', 4,3', or the 4,4' positions, and wherein Z includes, but is not limited to divalent radicals of formula (XI):

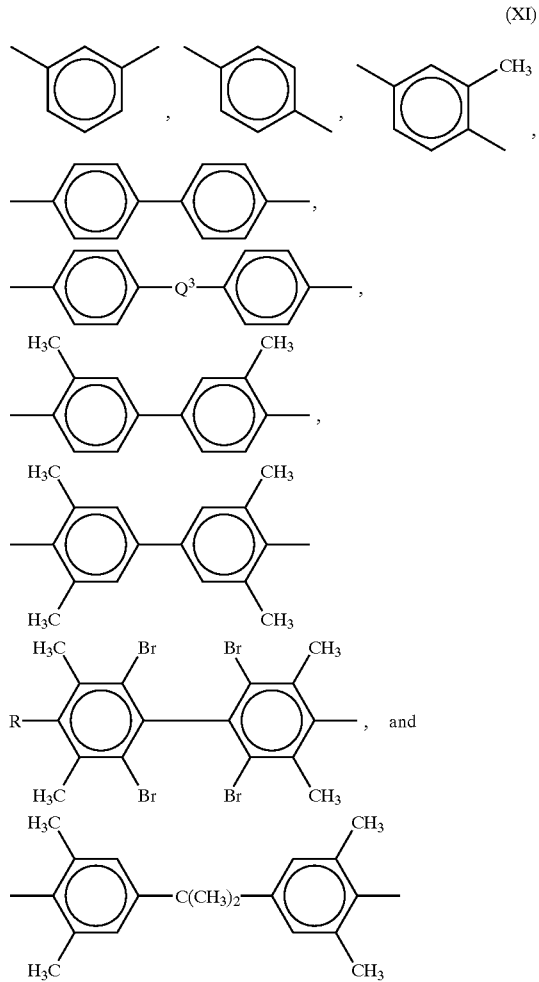

(XI)

wherein $Q^3$ is a divalent moiety selected from —O—, —S—, —C(O)—, —SO$_2$—, $C_y$, $H_{2y}$—, y being an integer from 1 to 5. In formula (X) $R^3$ is substituted or unsubstituted divalent organic radical such as: (a) a $C_6$–$C_{20}$ aromatic hydrocarbon radical or a halogenated derivative thereof; (b) a $C_2$–$C_{20}$ straight or branched chain alkylene radical; (c) a $C_3$–$C_{20}$ cycloalkylene radical, or (d) a divalent radical of the formula (XII):

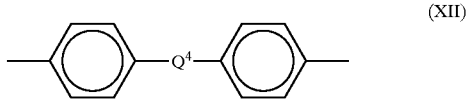

(XII)

wherein $Q^4$ is a divalent moiety selected from —O—, —S—, —C(O)—, —SO$_2$—, —$C_y$, $H_{2y}$— (y' being an integer from 1 to 5), and halogenated derivatives thereof, including perfloroalkylene groups.

Polyetherimides may be prepared according to methods described in, for example, U.S. Pat. Nos. 3,803,085 and 3,905,942. Polyetherimides are also commercially available as, from example, General Electric Company under the trademark ULTEM®.

Acrylonitrile-butadiene-styrene copolymers (ABS) type polymers contain two or more polymeric parts of different compositions, which are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The conjugated diene monomers normally utilized in preparing the backbone of the graft polymer are described by the following formula (XIII):

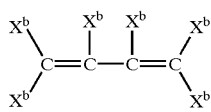

(XIII)

wherein $X^b$ is hydrogen, $C_1$–$C_5$ alkyl, chlorine, bromine, or the like. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures comprising at least one of the foregoing dienes, and the like. A preferred conjugated diene is butadiene.

One monomer or group of monomers that may be polymerized in the presence of the prepolymerized backbone are monovinylaromatic hydrocarbons. The monovinylaromatic monomers utilized are described by the following formula (XIV):

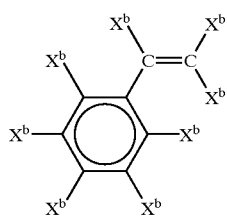

(XIV)

wherein $X^b$ is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures comprising at least one of the foregoing compounds, and the like. The preferred monovinylaromatic hydrocarbons are styrene and/or alpha-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and $C_1$–$C_7$ alkyl acrylates such as methyl methacrylate, and the like.

The acrylonitrile, substituted acrylonitrile, or acrylic acid esters are described by the following formula (XV):

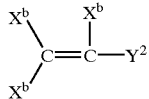

(XV)

wherein $X^b$ is as previously defined and $Y^2$ is cyano, $C_1$–$C_{12}$ carbalkoxy, or the like. Examples of such monomers include acrylonitrile, ethacrylonitrile, methacrylonitrile, alpha-chloroacrylonitrile, beta-chloroacrylonitrile, alpha-bromoacrylonitrile, and beta-bromoacrylonitrile, methyl acrylate, methyl methacrylate, ethyl acrylate, butyl acrylate, propyl acrylate, isopropyl acrylate, mixtures comprising at least one of the foregoing monomers, and the like. Preferred monomers include acrylonitrile, ethyl acrylate, and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methylstyrene-acrylonitrile copolymer. Also, there are occasions where a copolymer, such as alpha-methylstyrene-acrylonitrile, is added to the graft polymer copolymer blend. When the graft as polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, mixtures comprising at least one of the foregoing, and the like. Additionally, minor amounts of a diene may be copolymerized in the acrylate rubber backbone to yield improved grafting with the matrix polymer.

Acrylonitrile-butadiene-styrene resins are well known in the art and many are commercially available, including, for example, the high-rubber acrylonitrile-butadiene-styrene resins available from General Electric Company as BLENDEX® grades 131, 336, 338, 360, and 415.

The thermoplastic resin is present in the composition at about 10 to about 99 weight percent, based on the total weight of the composition. Within this range, it may be preferred to use at least about 30 weight percent, more preferably at least about 40 weight percent. Also within this range, it may be preferred to use up to about 90 weight percent, more preferably up to about 80 weight percent.

The electromagnetic shielding agent as used in the present composition comprises metal-coated fiber in combination with metal fiber. Suitable core materials for the metal-coated fiber may include vitreous mineral such as glass, silicates of aluminum, silicates of magnesium, silicates of calcium, and the like; and inorganic carbon materials such as graphite, carbon powders, carbon fibers, mica, and the like. Any metals capable of enhancing the shield effectiveness of thermoplastic resins may be used as the metal coating of the metal-coated fiber. Suitable metals include silver, gold, copper, aluminum, nickel, platinum, alloys comprising at least one of the foregoing metals, combinations comprising at least one of the foregoing metals, and the like. A presently preferred metal-coated fiber is silver-coated vitreous mineral fiber.

The metal content of the metal-coated fiber may be about 1 to about 30 weight percent, based on the total weight of the metal-coated fiber. Within this range, it may be preferred to use at least about 10 weight percent of the metal. Also within this range, it may be preferred to use up to about 20 weight percent, more preferably up to about 15 weight percent of the metal.

The length of the metal-coated fiber before and after extrusion and/or molding of the composition may be about 25 to about 600 micrometers. Within this range, the preferred length of the metal-coated fiber may be at least about 50 micrometers, more preferably at least about 150 micrometers. Also within this range, the length of the metal-coated fiber may be up to about 500 micrometers, more preferably up to about 400 micrometers, even more preferably up to about 300 micrometers. The diameter of the metal-coated fiber may be about 1 to about 10 micrometers. Within this range, the preferred diameter of the metal-coated fiber may be at least about 3 micrometers, more preferably at least about 5 micrometers. Also within this range, the diameter of the metal-coated fiber may be up to about 8 micrometers, more preferably up to about 6 micrometers.

The metal-coated fiber may be present in the composition at about 0.1 to about 29 weight percent, based on the total weight of the composition. Within this range, it may be preferred to use at least about 1 weight percent, more preferably at least about 3 weight percent of the metal-coated fiber based on the total weight of the composition. Also within this range, it may be preferred to use up to about 20 weight percent, more preferably up to about 10 weight percent, yet more preferably up to about 5 weight percent of the metal-coated fiber, based upon the total weight of the composition.

The metal fiber used in the electromagnetic shielding agent may be any conductive metal fiber. Suitable metals include iron, copper, aluminum, nickel, titanium, and alloys of the foregoing metals. Combinations of the foregoing metals are also contemplated. A preferred metal fiber is stainless steel fiber. Stainless steel fibers include those comprising alloys of iron with chromium, nickel, carbon, manganese, molybdenum, mixtures comprising at least one of the foregoing, and the like. Suitable stainless steel compositions may also be designated according to commonly used grades such as stainless steel 316, stainless steel 347, and the like. All of the above materials are commercially available. For example, stainless steel fibers are commercially available from Bekaert under the tradename BEKI-SHIELD®.

The length of the metal fiber may be about 1 to about 30 millimeters prior to molding. Within this range, the preferred length of the metal fiber may be at least about 3 millimeters, more preferably at least about 5 millimeters, even more preferably about 10 millimeters. Also within this range, the length of the metal fiber may be up to about 20 millimeters, more preferably up to about 15 millimeters. After molding, the length of the metal fiber may be less than specified above. For example, the length of the metal fiber after molding may be about 30 micrometers to about 3 millimeters. The diameter of the metal fiber may be about 4 to about 20 micrometers, both before and after molding. Within this range, the preferred diameter of the metal fiber may be at least about 8 micrometers. Also within this range, the diameter of the metal fiber may be up to about 15 micrometers, more preferably up to about 12 micrometers, even more preferably up to about 10 micrometers.

In one embodiment, the metal fiber may be provided as a concentrate comprising about 20 to about 80 weight percent metal fiber and about 80 to about 20 weight percent thermoplastic resin based on the total weight of the concentrate. Within these ranges, it may be preferred to use a metal fiber amount of at least about 30 weight percent, more preferably at least about 40 weight percent. Also within this range, it may be preferred to use a metal fiber amount of up to about 70 weight percent, more preferably up to about 60 weight percent.

The metal fiber may be present in the composition at about 1 to about 29.9 weight percent, based on the total weight of the composition. Within this range, it may be preferred to use at least about 3 weight percent, more preferably about 5 weight percent of the metal fiber based on the total weight of the composition. Also within this range, it may be preferred to use up to about 25 weight percent, more preferably up to about 20 weight percent, more preferably up to about 10 weight percent of the metal fiber, based upon the total weight of the composition.

In one embodiment, the weight ratio of the metal-coated fiber to the metal fiber may be about 5:1 to about 1:10. Within this range, it may be preferred to have a weight ratio of at least about 1:8, more preferably at least about 1:4. Also within this range, it may be preferred to have a weight ratio of up to about 1:1, more preferably up to about 1:2.

In one embodiment, the ratio of the length of the metal-coated fiber to the length of the metal fiber may be about 1:10 to about 1:500. Within this range, it may be preferred to have a ratio of at least about 1:300, more preferably at least about 1:150. Also within this range, it may be preferred to have a length ratio of up to about 1:30, more preferably up to about 1:50.

In one embodiment, the compositions herein may contain an electromagnetic shielding agent that is substantially free of a metal powder and a metal flake. The term "substantially free" is herein defined as limiting the amount of the powder or flake to less than about 0.1 weight percent, based on the total weight of the composition. It may be preferred that the powder or flake is present at less than about 0.01 weight percent, and it is highly preferred that the powder or flake is not intentionally added to the composition in any amount.

In another embodiment, the composition contains an electromagnetic shielding agent comprising about 0.5 to about 10 weight percent of metal powder and/or metal flake, based on the total weight of the composition. Suitable metal powders and flakes may comprise iron, silver, aluminum, nickel, copper, alloys comprising at least one of the foregoing metals, mixtures comprising at least one of the foregoing metals, and the like. Fibers, powders, and flakes may be distinguished from each other on the basis of their aspect ratios. Fibers may be defines has having a number average aspect ratio greater than about 4, where the aspect ratio is defined as the ratio of the length to the equivalent circular diameter. In contrast, flakes may be defined as having a number average aspect ratio less than about 0.25, and powders may be defined as having a number average aspect ratio of about 0.25 to about 4.

The composition may, optionally, further comprise one or more additives known in the art and ordinarily incorporated in resin compositions. Such additives include, for example, fillers and reinforcing agents; heat stabilizers; antioxidants; light stabilizers; plasticizers; antistatic agents; mold releasing agents; additional resins; blowing agents, and the like. Examples of fillers or reinforcing agents include glass fibers, asbestos, carbon fibers, silica, talc, mica, calcium carbonate, and the like. Examples of heat stabilizers include triphenyl phosphite, tris-(2,6-dimethylphenyl)phosphite, tris-(mixed mono-and di-nonylphenyl)phosphite, dimethylbenene phosphonate, tris-(2,4-di-t-butylphenyl)phosphite, trimethyl phosphate, and the like. Examples of antioxidants include hindered phenol antioxidants such as octadecyl-3-(3,5-di-tert-butyl-4-hydroxyphenyl)propionate, pentaerythrityl-tetrakis[3-(3,5-di-tert-butyl-4-hydroxyphenyl) propionate], and the like. Examples of light stabilizers include benzotriazoles such as 2-(2-hydroxy-5-methylphenyl)-benzotriazole, 2-(2-hydroxy-5-tert-octylphenyl)-benzotriazole, 2-hydroxy-4-n-octoxy benzophenone, and the like. Examples of plasticizers include dioctyl-4,5-epoxy-hexahydrophthalate, tris-(octoxycarbonylethyl) isocyanurate, tristearin, epoxidized soybean oil, and the like. Examples of the antistatic agents include glycerol monostearate, sodium stearyl sulfonate, pentaerythryitol tetrastearate, sodium dodecylbenzenesulfonate, and the like. Examples of mold releasing agents include stearyl stearate, beeswax, montan wax, paraffin wax, and the like. Combinations of any of the foregoing additives may be used. Such additives may be mixed at a suitable time during the mixing of the components for forming the composition.

There is no particular limitation on the method by which the composition is prepared. For example, the ingredients may be placed into an extrusion compounder with the thermoplastic resin to produce molding pellets. Alternatively, the ingredients may be mixed with a thermoplastic resin by dry blending, then either fluxed on a mill and comminuted, or extruded and chopped. Further, the ingredients may also be mixed with powder or granular thermoplastic resin and directly molded, e.g., by injection or transferred molding techniques.

In another embodiment, the thermoplastic compositions may be prepared by first forming a concentrate of any one or more metal fibers and/or metal-coated fibers in the base thermoplastic resin or any compatible thermoplastic resin (i.e., one which will not cause delamination in the blended composition). The concentrate may be extruded and cut up into molding compounds such as conventional granules, pellets, and the like by standard techniques. Thereafter the concentrate may be incorporated with other ingredients by any of the foregoing methods or other blending methods known in the art.

The compositions described herein may have a shielding effectiveness of at least about 10 decibels measured according to the American Society for Testing and Materials' (ASTM) standard test method for measuring the electromagnetic shielding effectiveness of planar materials (D4935). The compositions may be preferred to have a shielding effectiveness of at least about 20 decibels, more preferably at least about 30 decibels, yet more preferably at least about 40 decibels, even more preferably at least about 50 decibels, still more preferably at least about 60 decibels.

One embodiment provides a composition, comprising: about 50 to about 99 weight percent of a polycarbonate; and about 1 to about 10 weight percent of an electromagnetic shielding agent; wherein the electromagnetic shielding agent comprises a silver-coated glass fiber and a stainless steel fiber; wherein all weight percents are based on the total weight of the composition; and wherein the composition after molding has a shielding effectiveness of at least about 10 decibels measured according to ASTM D4935.

Another embodiment provides a composition comprising about 50 to about 97 weight percent of a polycarbonate; and an electromagnetic shielding agent; wherein the electromagnetic shielding agent comprises about 1 to about 5 weight percent of a silver-coated glass fiber and about 2 to about 20 weight percent of a stainless steel fiber; wherein all weight percents are based on the total weight of the composition; and wherein the composition after molding has a shielding effectiveness of at least about 25 decibels measured according to ASTM D4935.

A further embodiment provides a composition comprising about 50 to about 93 weight percent of a polycarbonate; and an electromagnetic shielding agent; wherein the electromagnetic shielding agent comprises about 2 to about 5 weight percent of a silver-coated glass fiber and about 5 to about 20 weight percent of a stainless steel fiber; wherein all weight percents are based on the total weight of the composition; and wherein the composition after molding has a shielding effectiveness of at least about 35 decibels measured according to ASTM D4935.

Still a further embodiment provides a composition comprising about 50 to about 87 weight percent of a polycarbonate; and an electromagnetic shielding agent; wherein the electromagnetic shielding agent comprises about 3 to about 5 weight percent of a silver-coated glass fiber and about 10 to about 20 weight percent of a stainless steel fiber; wherein all weight percents are based on the total weight of the composition; and wherein the composition after molding has a shielding effectiveness of at least about 50 decibels measured according to ASTM D4935.

One embodiment provides a method of preparing a composition comprising blending a thermoplastic resin and about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

It should be clear that the invention encompasses reaction products of the above-described compositions.

The present compositions may be molded into pellets. The compositions may be molded, foamed, or extruded by known methods into various structures or articles, especially those benefiting from EMI shielding, such as electronic equipment, electronic housings, or electronic components. Non-limiting examples include computer housings, cell phone components, hand held electronic devices such as pagers, video games, calculators, wireless car entry devices, automotive parts, filter housings, luggage carts, and office chairs.

The invention is further illustrated by the following non-limiting examples.

EXAMPLES 1–5 AND COMPARATIVE EXAMPLES 1–9

A polycarbonate (PC) having repeating units derived from bisphenol A, sold as LEXAN® ML5221 was obtained in powder form from General Electric Company. This polycarbonate had a weight average molecular weight of about 22,500 atomic mass units (AMU) as measured by gel permeation chromatography using polystyrene standards. Silver-coated vitreous mineral fiber (Ag) was obtained from Energy Strategy Associates having a total silver content of 5 percent to 20 percent by weight (this is the range specified by the manufacturer for a single sample). The silver-coated fiber has an average length of 150 micrometers and an average diameter of 6 micrometers. The stainless steel fibers (SS) are obtained from Montsinger Technologies Incorporated (MTI) as a 50 weight percent concentrate with polycarbonate, the polycarbonate having a weight average molecular weight of about 22,500 AMU as measured by gel permeation chromatography using polystyrene standards. The stainless steel fiber has an average length of 13 millimeters. All amounts are expressed in percent by weight based on the total weight of the composition, unless otherwise indicated.

The formulations were prepared by first compounding 20 percent by weight of the silver coated fibers with polycarbonate. This was achieved using a Werner and Pfleiderer Model 28 twin screw extruder. An extrusion temperature of 280° C. and a screw rotation of 300 RPM was used throughout the experiments. The total barrel length of the twin screw extruder was 960 mm. The silver-coated fibers were added to the extruder at a downstream location of 625 mm. The 20% by weight compositions of silver coated fibers were then dry blended with pure polycarbonate pellets of number average molecular weight 22,500 AMU and with a 50 percent concentrate of stainless steel and polycarbonate. The compositions of these three components were varied to obtain the appropriate ratios of stainless steel fibers to silver metal coated fibers. These various formulations were then molded into test specimens on a Van Dorn 120 ton injection molding machine with a temperature setting of 287° C. and a mold temperature of 49° C. The test specimens were molded into 5.25-inch diameter disks having a thickness of 1.5 millimeters.

Test specimens were evaluated for electromagnetic shielding effectiveness (SE) in accordance with ASTM D4935 using an Electro-Metrics EM-2107A coaxial transmission line test fixture and a HP 8752C Network Analyzer. Shielding effectiveness of the specimens was measured over a radio frequency range of 30 to 1500 megahertz, with results expressed in units of decibels. Shielding effectiveness is a measure of the attenuation of electromagnetic interference (EMI)/radio frequency interference (RFI) expressed in decibels wherein attenuation is a function of the electrical conductivity and/or magnetic susceptibility of the shield. The decibel unit is a logarithmic measure of the degree of the shielding. A 10 decibel reading indicates that 90% of the EMI/RFI energy is effectively dissipated. Twenty decibels means that 99% of the EMI/RFI is dissipated, and so on.

Table 1 contains electromagnetic shielding effectiveness data as a function of the loading of metal-coated fiber and/or metal fiber.

TABLE 1

| | PC (weight %) | Ag fiber (weight %) | SS fiber (weight %) | Shielding effect (dB) |
| --- | --- | --- | --- | --- |
| Comp. Ex. 1 | 95 | 5 | — | 0.21 |
| Comp. Ex. 2 | 90 | 10 | — | 0.30 |
| Comp. Ex. 3 | 80 | 20 | — | 0.32 |
| Comp. Ex. 4 | 97.5 | — | 2.5 | 10 |
| Ex. 1 | 96.5 | 1.0 | 2.5 | 25 |
| Ex. 2 | 95 | 1.0 | 4.0 | 33 |

TABLE 1-continued

| | PC (weight %) | Ag fiber (weight %) | SS fiber (weight %) | Shielding effect (dB) |
| --- | --- | --- | --- | --- |
| Comp. Ex. 5 | 95 | — | 5 | 17 |
| Comp. Ex. 6 | 90 | — | 10 | 25 |
| Ex. 3 | 90 | 5 | 5 | 37 |
| Ex. 4 | 85 | 5 | 10 | 65 |
| Comp. Ex. 7 | 80 | — | 20 | 52 |
| Comp. Ex. 8 | 75 | — | 25 | 60 |
| Ex. 5 | 75 | 5 | 20 | 78 |
| Comp. Ex. 9 | 70 | — | 30 | 70 |

As shown in Table 1. Comparative Examples 1–3, which contain only silver-coated fibers, exhibit poor shielding effectiveness even at high loadings of coated fiber. Comparative Examples 4–9, containing only stainless steel fibers exhibit moderate shielding effectiveness values. Increasing the loading of stainless steel fiber increases the shielding effectiveness accordingly. It was unexpectedly found that a synergy is obtained when silver-coated fiber is combined with stainless steel fiber at low loadings to result in compositions with greatly improved shielding effectiveness (Examples 1–2). For instance, the combination of 1 weight percent silver-coated fiber and 2.5 weight percent stainless steel fiber exhibits an equivalent shielding effectiveness as a sample containing 10 percent stainless steel (Ex. 1 versus Comp. Ex. 6). Increasing the amounts in the combination to 5 weight percent silver-coated fiber and 5 weight percent of stainless steel fiber results in a composition exhibiting a greatly increased shielding effectiveness compared to a sample containing only 10 weight percent of stainless steel fiber (Ex. 3 versus Comp. Ex. 6). Further increasing the amount of stainless steel fiber to 10 weight percent and maintaining 5 weight percent silver-coated fiber results in a shielding effectiveness that is greater than a composition containing either 20 or 25 weight percent of stainless steel fiber (Ex. 4 versus Comp. Ex. 7 and Comp. Ex. 8). As shown by the Examples, a synergy is created with the combination of silver-coated fibers and stainless steel fibers to result in polycarbonate compositions with good shielding effectiveness without resorting to high loadings of conductive materials.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A composition, comprising:
    a thermoplastic resin; and
    about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

2. The composition of claim 1, wherein the thermoplastic resin is selected from the group consisting of polycarbonates, polyesters, polyamides, polyetheresters, polyestercarbonates, poly(arylene ether)s, polyamideimides, polyetherimides, polystyrenes, acrylonitrile-butadiene-styrene copolymers, and blends comprising at least one of the foregoing resins.

3. The composition of claim 1, wherein the thermoplastic resin is a polycarbonate.

4. The composition of claim 3, wherein the polycarbonate comprises structural units of the formula (I):

(I)

wherein $R^1$ is selected from the group consisting of $C_1$–$C_{12}$ aliphatic radicals, $C_5$–$C_7$ alicyclic radicals, $C_6$–$C_{20}$ aromatic radicals, and $C_6$–$C_{20}$ aromatic organic radicals having the structural formula (II):

—$A^1$—$Y^1$—$A^2$—   (II)

wherein $A^1$ and $A^2$ are independently a monocyclic divalent $C_6$–$C_{20}$ aryl radical and $Y^1$ is selected from the group consisting of —O—, —S—, —S(O)—, —S(O)$^6{}_2$—, –C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene.

5. The composition of claim 1, comprising about 10 weight percent to about 99 weight percent of the thermoplastic resin based on the total weight of the composition.

6. The composition of claim 1, wherein the metal-coated fiber comprises a core fiber of inorganic carbon or vitreous mineral.

7. The composition of claim 1, wherein the metal-coated fiber comprises a metal selected from the group consisting of silver, gold, copper, aluminum, nickel, platinum, alloys comprising at least one of the foregoing metals, and combinations comprising at least one of the foregoing metals.

8. The composition of claim 1, wherein the metal-coated fiber is silver-coated glass fiber.

9. The composition of claim 1, wherein the metal-coated fiber comprises a metal content of about 1 to about 30 weight percent based on the total weight of the metal-coated fiber.

10. The composition of claim 1, wherein the metal-coated fiber has a length of about 25 to about 500 micrometers.

11. The composition of claim 1, wherein the metal-coated fiber has a diameter of about 1 to about 10 micrometers.

12. The composition of claim 1, comprising about 0.1 to about 29 weight percent metal-coated fiber, based on the total weight of the composition.

13. The composition of claim 1, wherein the metal fiber comprises a metal selected from the group consisting of iron, copper, aluminum, nickel, titanium, alloys comprising at least one of the foregoing metals, and combinations comprising at least one of the foregoing metals.

14. The composition of claim 1, wherein the metal fiber is stainless steel fiber.

15. The composition of claim 1, wherein the metal fiber has a length of at least about 10 millimeters prior to molding.

16. The composition of claim 1, wherein the metal fiber has a length of about 30 micrometers to about 3 millimeters after molding.

17. The composition of claim 1, wherein the metal fiber has a diameter of about 4 to about 20 micrometers.

18. The composition of claim 1, wherein the metal fiber is provided as a concentrate comprising about 20 to about 80 weight percent metal fiber and about 80 to about 20 weight percent thermoplastic resin based on the total weight of the concentrate.

19. The composition of claim 1, comprising about 1 to about 29.9 weight percent of the metal fiber, based on the total weight of the composition.

20. The composition of claim 1, wherein the weight ratio of the metal-coated fiber to the metal fiber is about 5:1 to about 1:10.

21. The composition of claim 1, wherein the ratio of the length of the metal-coated fiber to the length of the metal fiber is about 1:10 to about 1:500.

22. The composition of claim 1, wherein the electromagnetic shielding agent is substantially free of a metal powder and/or a metal flake.

23. The composition of claim 1, wherein the electromagnetic shielding agent further comprises a metal powder, a metal flake, or a combination thereof.

24. The composition of claim 1, wherein the composition after molding has a shielding effectiveness of at least about 30 decibels measured according to ASTM D4935.

25. The composition of claim 1, wherein the composition after molding has a shielding effectiveness of at least about 60 decibels measured according to ASTM D4935.

26. A composition, comprising:
about 50 to about 99 weight percent of a polycarbonate; and
about 1 to about 10 weight percent of an electromagnetic shielding agent, wherein the electromagnetic shielding agent comprises a silver-coated glass fiber and a stainless steel fiber, wherein all weight percents are based on the total weight of the composition, and wherein the composition after molding has a shielding effectiveness of at least about 10 decibels measured according to ASTM D4935.

27. A composition, comprising:
about 50 to about 97 weight percent of a polycarbonate; and
an electromagnetic shielding agent, wherein the electromagnetic shielding agent comprises about 1 to about 5 weight percent of a silver-coated glass fiber and about 2 to about 20 weight percent of a stainless steel fiber, wherein all weight percents are based on the total weight of the composition, and wherein the composition after molding has a shielding effectiveness of at least about 25 decibels measured according to ASTM D4935.

28. A composition, comprising:
about 50 to about 93 weight percent of a polycarbonate; and
an electromagnetic shielding agent, wherein the electromagnetic shielding agent comprises about 2 to about 5 weight percent of a silver-coated glass fiber and about 5 to about 20 weight percent of a stainless steel fiber, wherein all weight percents are based on the total weight of the composition, and wherein the composition after molding has a shielding effectiveness of at least about 35 decibels measured according to ASTM D4935.

29. A composition, comprising:
about 50 to about 87 weight percent of a polycarbonate; and
an electromagnetic shielding agent, wherein the electromagnetic shielding agent comprises about 3 to about 5 weight percent of a silver-coated glass fiber and about 10 to about 20 weight percent of a stainless steel fiber, wherein all weight percents are based on the total weight of the composition, and wherein the composition after molding has a shielding effectiveness of at least about 50 decibels measured according to ASTM D4935.

30. A composition, comprising the reaction product of:

a thermoplastic resin; and about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

31. An article comprising the composition of claim 30.

32. An electrical or electronic device comprising the composition of claim 30.

33. A pellet comprising the composition of claim 30.

34. A method of preparing a composition, comprising:

blending a thermoplastic resin and about 1 to about 30 weight percent of an electromagnetic shielding agent, wherein the electromagnetic shielding agent comprises a metal-coated fiber and a metal fiber, and wherein the composition after molding has a shielding effectiveness of at least about 10 decibels measured according to ASTM D4935.

* * * * *